(12) United States Patent
Ukai

(10) Patent No.: US 11,422,660 B2
(45) Date of Patent: *Aug. 23, 2022

(54) INPUT DEVICE, INPUT METHOD AND PROGRAM

(71) Applicant: RAKUTEN GROUP, INC., Tokyo (JP)

(72) Inventor: Hiroshi Ukai, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 17/001,688

(22) Filed: Aug. 25, 2020

(65) Prior Publication Data

US 2020/0387258 A1 Dec. 10, 2020

Related U.S. Application Data

(63) Continuation of application No. 14/651,225, filed as application No. PCT/JP2014/064507 on May 30, 2014, now Pat. No. 10,788,917.

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 2203/04104* (2013.01)

(58) Field of Classification Search
CPC ......... G06F 3/044–0448; G06F 3/0416–04186
See application file for complete search history.

(56) References Cited

U.S. PATENT DOCUMENTS

| 10,788,917 | B2* | 9/2020 | Ukai | G06F 3/0416 |
|---|---|---|---|---|
| 2007/0192691 | A1* | 8/2007 | Inazumi | G06F 3/0425 |
| | | | | 715/700 |
| 2008/0087477 | A1* | 4/2008 | Cho | G06F 3/0416 |
| | | | | 178/18.01 |
| 2009/0095540 | A1* | 4/2009 | Zachut | G06K 9/00 |
| | | | | 178/18.03 |
| 2010/0127995 | A1* | 5/2010 | Rigazio | G06F 3/04886 |
| | | | | 345/173 |
| 2011/0291944 | A1* | 12/2011 | Simmons | G06F 3/04186 |
| | | | | 345/173 |
| 2012/0182238 | A1* | 7/2012 | Lee | G06F 3/0418 |
| | | | | 345/173 |
| 2013/0106733 | A1* | 5/2013 | Wang | G06F 3/04186 |
| | | | | 345/173 |
| 2016/0259442 | A1* | 9/2016 | Ukai | G06F 3/0416 |
| 2020/0387258 | A1* | 12/2020 | Ukai | G06F 3/04166 |

* cited by examiner

*Primary Examiner* — Patrick F Marinelli
(74) *Attorney, Agent, or Firm* — HEA Law PLLC

(57) ABSTRACT

A position indicated by a user with a finger or a stylus can be detected even in a case where an edge of a hand on a little finger side or a wrist touches a touch panel.

An input device acquires information indicating a plurality of points on a touch panel affected by a user's touch, including the touch with a finger or a stylus, calculates distances between a reference position and at least some of the plurality of points, the reference position indicating a position touched by the user on the touch panel other than with the finger or the stylus, selects one or more points affected by the touch with the finger or the stylus from the at least some of the plurality of points based on the calculated distances, and acquires coordinates of a position indicated by the user based on the selected point.

16 Claims, 9 Drawing Sheets

INPUT DEVICE, INPUT METHOD AND PROGRAM

CROSS-REFERENCE TO RELATED APPLICATION

This application claims priority to and is a Division of U.S. application Ser. No. 14/651,225 filed on Jun. 11, 2015 which is a National Stage of International Application No. PCT/JP2014/064507 filed on May 30, 2014, the content of which is hereby incorporated by reference into this application.

TECHNICAL FIELD

The present invention relates to an input device, an input method and a program.

BACKGROUND ART

It is increasing to enter characters and graphics with use of a touch panel having a large touch-sensitive area, such as a tablet computer. When characters and graphics are input to a touch-sensitive area with a finger or a stylus, sometimes an edge of a hand on a little finger side, an edge of a palm above a wrist, or a wrist itself, which are collectively referred to as "an edge of a little finger side or other portions of a hand" or "a trunk of a hand" in the followings, comes in touch with the touch-sensitive area of the touch panel. If these parts come in touch with the touch-sensitive area of the touch panel, a position of the finger or the stylus indicated by the user cannot be detected.

In this regard, Patent Literature 1 discloses that a capacitive touch panel detects whether or not a palm touches the touch panel using the maximum detected value at a certain detection point and detected values of detection points before and after the certain detection point, and does not generate coordinate data when the palm touches the touch panel.

CITATION LIST

Patent Document

Patent Literature 1: JP2002-82765A

SUMMARY OF INVENTION

Technical Problem

However, according to the known art mentioned above, generating the coordinate data is stopped when the palm touches the touch panel, and thus a touched position of the fingertip or the stylus indicated by the user cannot be detected.

One or more embodiments of the present invention have been conceived in view of the above, and an object thereof is to provide an input device, an input method, and a program for detecting a position indicated by a user with a finger, a stylus or the like even if an edge of a little finger side or other portions of a hand touches a touch-sensitive area of a touch panel.

Solution to Problem

In order to solve the above described problems, an input device according to the present invention includes acquiring means for acquiring information indicating a plurality of points on a touch panel which are affected by one or more touches of a user, including a touch with a finger or a stylus, distance calculating means for calculating distances between a reference position and at least some of the plurality of points, the reference position indicating a position touched by the user on the touch panel other than with the finger or the stylus, selecting means for selecting one or more points affected by the touch with the finger or the stylus from the at least some of the plurality of points based on the calculated distances, and coordinate acquiring means for acquiring coordinates of a position indicated by the user based on the selected one or more points.

An input method according to the present invention includes: acquiring information indicating a plurality of points on a touch panel which are affected by one or more touches of a user, including a touch with a finger or a stylus, calculating distances between a reference position and at least some of the plurality of points, the reference position indicating a position touched by the user on the touch panel other than with the finger or the stylus, selecting one or more points affected by the touch with the finger or the stylus from the at least some of the plurality of points based on the calculated distances, and acquiring coordinates of a position indicated by the user based on the selected one or more points.

A program according to the present invention causes a computer to execute processing including acquiring information indicating a plurality of points on a touch panel which are affected by one or more touches of a user, including a touch with a finger or a stylus, calculating distances between a reference position and at least some of the plurality of points, the reference position indicating a position touched by the user on the touch panel other than with the finger or the stylus, selecting one or more points affected by the touch with the finger or the stylus from the at least some of the plurality of points based on the calculated distances, and acquiring coordinates of a position indicated by the user based on the selected one or more points.

According to the present invention, it is possible to reliably detect a position indicated by a user with a finger or a stylus even if an edge of a little finger side or other portions of a hand touches a touch panel.

In an embodiment of the present invention, the input device further includes determining means for determining whether or not there are a plurality of touches of the user on the touch panel, and reference position acquiring means for acquiring the reference position in a case where it is determined that there are the plurality of touches of the user on the touch panel. The distance calculating means may calculate the distances based on the acquired reference position, and the selecting means may select the one or more points based on the distances.

In an embodiment of the present invention, the determining means may determine whether or not there are the plurality of touches based on a variance of the plurality of points.

In an embodiment of the present invention, the determining means may determine whether or not there are the plurality of touches of the user based on a size of an area touched by the user.

In an embodiment of the present invention, the reference position may be the center of gravity based on the plurality of points.

In an embodiment of the present invention, the plurality of points respectively correspond to a plurality of portions on the touch panel where capacitance is measured.

In an embodiment of the present invention, the distance calculating means may calculate the reference position based on respective positions of the plurality of points and measurement values at the plurality of points.

In an embodiment of the present invention, the plurality of points may indicate positions of the plurality of touches of the user on the touch panel.

DESCRIPTION OF EMBODIMENTS

Figure 1:
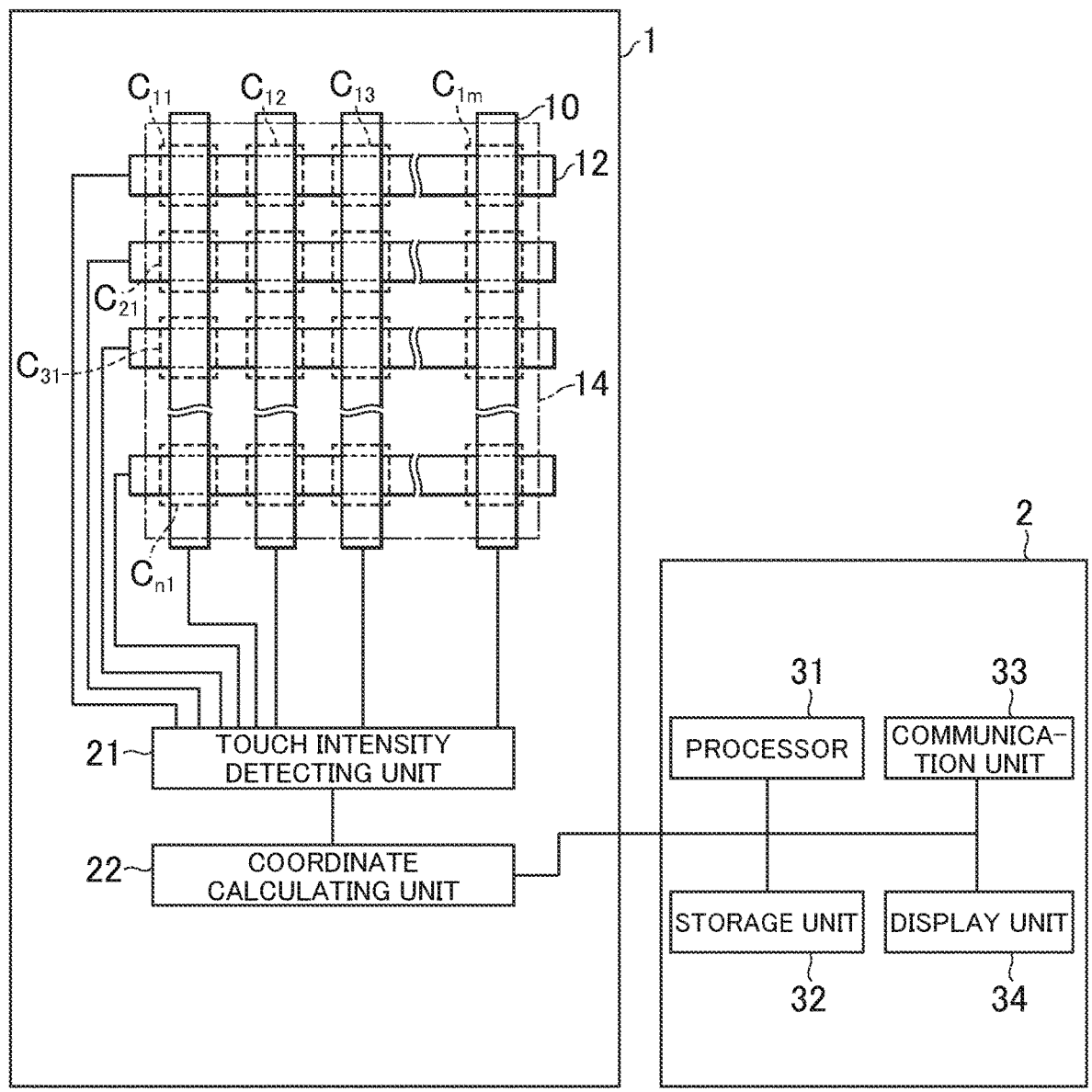
FIG. 1 is a diagram illustrating an example of configuration of a touch panel input device according to the first embodiment of the present invention.

An embodiment of the present invention will be described below in detail with reference to the accompanying drawings. The elements having the same functions are designated with the same reference characters, and their overlapping explanation will be omitted.

First Embodiment

FIG. 1 is a diagram illustrating an example of configuration of a touch panel input device according to the first embodiment of the present invention. The touch panel input device includes a touch panel 1, which is a capacitive touch panel, and a host 2. Specifically, the touch panel input device is a tablet computer and an electronic book reader, for example.

The touch panel 1 includes scanning electrodes 10 disposed longitudinally, detection electrodes 12 disposed laterally, a touch intensity detecting unit 21 that detects signals indicating touch intensity of measuring portions C at respective portions where the scanning electrodes 10 and the detection electrodes 12 intersect, and a coordinate calculating unit 22. The touch panel 1 is a capacitive touch panel.

The host 2 includes a processor 31, a storage unit 32, a communication unit 33, and a display unit 34. The processor 31 executes a program stored in the storage unit 32, and controls the communication unit 33 and the display unit 34. The program may be provided via the Internet or by being stored in a computer-readable storage medium such as a flash memory.

The storage unit 32 includes a memory device such as a RAM or a flash memory, and a hard disk drive. The storage unit 32 stores the program. In addition, the storage unit 32 stores information and computational result input from each unit.

The communication unit 33 implements functions to communicate with other devices, and includes an integrated circuit constituting a wireless LAN and an antenna, for example. The communication unit 33 inputs information received from other devices into the processor 31 and the storage unit 32, and sends information to other devices under the control of the processor 31.

The display unit 34 includes a display output device and a video controller that controls the display output device. The display unit 34 outputs display data to the display output device under the control of the processor 31. The display output device may be connected outside of the touch panel input device.

Next, the touch panel 1 will be explained. The scanning electrodes 10 respectively extend in a horizontal direction of FIG. 1, and edges of the scanning electrodes 10 are connected to the touch intensity detecting unit 21 by wiring. The detection electrodes 12 respectively extend in a vertical direction of FIG. 1, and each edge of the detection electrodes is connected to the touch intensity detecting unit 21 by wiring. The measuring portions C are respectively placed at the positions where the scanning electrodes 10 and the detection electrodes 12 intersect. The touch intensity is a degree of proximity or contact. The measuring portions C are m×n matrix. In FIG. 1, a measuring portion C at ith row and jth column is described as Cij. For example, the measuring portion C11 is at the first row and the first column, and the measuring portion $C1m$ is at the first row and mth column. The measuring portions C are disposed within the touch-sensitive area 14 of the touch panel. In the following, a representative position (e.g., center) of the measuring portion Cij is described as measuring point Pij.

The touch intensity detecting unit 21 includes a scanning circuit that repeats, for each frame period, providing the scanning electrodes 10 with pulse signals in sequence, and a signal acquiring circuit that acquires a signal having touch intensity according to changes in mutual capacitance when the pulse is provided and makes AD conversion of the acquired signal of the touch intensity into data signal. When the scanning circuit applies a pulse to one of the scanning electrodes 10, the signal acquiring circuit outputs a data signal indicating touch intensity of the measuring portions C at the positions where the applied scanning electrode 10 intersects the detection electrodes 12. When the scanning circuit finishes scanning of all of the scanning electrodes 10 for one time each, the signal acquiring circuit outputs data signals indicating touch intensity of respective measuring portions C in the frame period. Here, one frame period corresponds to a sampling period of touch intensity.

Figure 2:
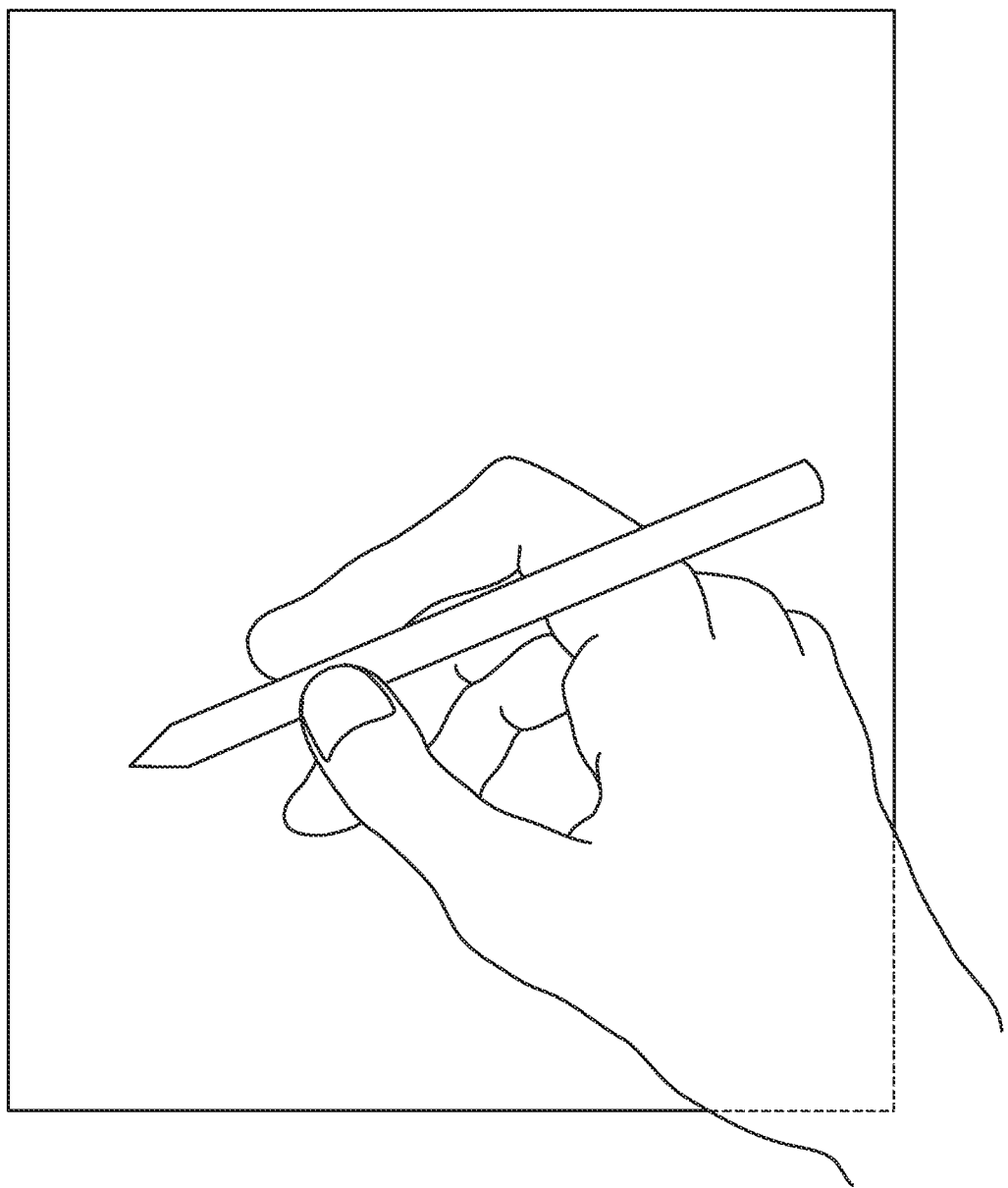
FIG. 2 is a diagram illustrating an example a relationship between a touch-sensitive area of a touch panel and a hand in a case of handwriting input.

FIG. 2 is a diagram illustrating an example of a relationship between the touch-sensitive area 14 of the touch panel and a hand in a case of handwriting input. When inputting by handwriting, a user makes plural touches on the touch-sensitive area 14 of the touch panel. More specifically, the user's stylus or finger, which indicates a position, touches the touch-sensitive area 14. In addition, a portion of the hand closer to the base of the hand (wrist) than the finger indicating the position or the fingers holding the stylus touches the touch-sensitive area 14. Such portion of the hand is, for example, an edge of a hand on a little finger side, a portion of a palm closer to a wrist than fingers, and a wrist itself, and a portion that touches the touch-sensitive area 14 to stabilize movement of a stylus or a finger when a user moves it.

Figure 3:
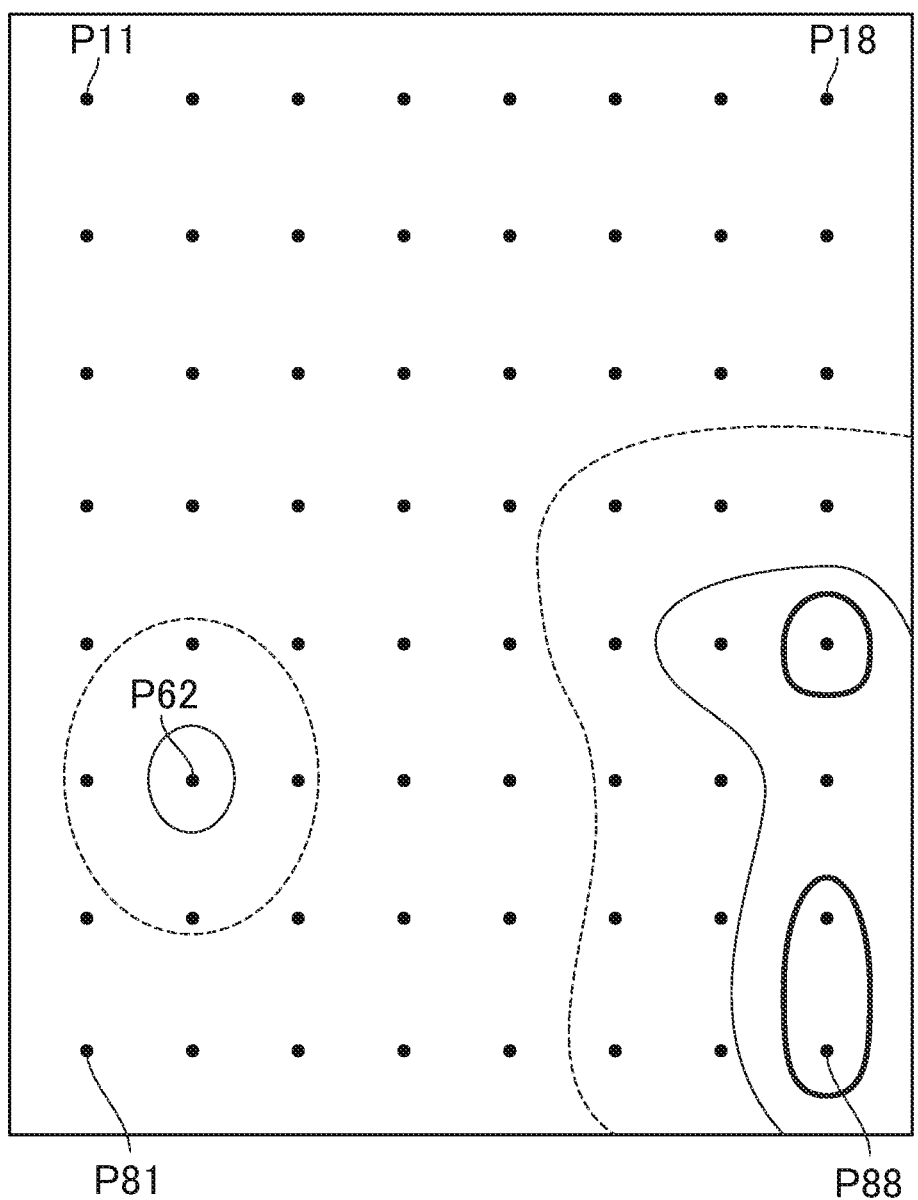
FIG. 3 is a diagram illustrating an example of measurement values of capacitance at respective measuring points.

FIG. 3 is a diagram illustrating an example of measurement values of capacitance at respective measuring points P. In FIG. 3, the measurement values are represented by a contour line graph. FIG. 3 represents that the values increase in the order of a dashed line, a thin solid line, and a thick solid line. For example, the dashed line indicates a value larger than a typical value of noise, and the thin solid line indicates such a value that is inevitably generated at the center of the touch. A circular area on the left side of FIG. 3 indicates peaks of the measurement values generated by touches of the stylus, and the contour lines in a larger area on the right side indicates peaks of the measurement values generated by, for example, touches of the edge of the hand on the little finger side.

As can be seen by the above discussion of FIG. 3, when the finger or the stylus and other portion of the hand (the edge of the little finger side of the hand, the edge of the palm near the wrist, and the wrist itself) closer than the finger touches the touch-sensitive area 14 of the touch panel 1, the touch intensity detecting unit 21 acquires a signal indicating the measuring points P affected by the touches. In fact, the measurement values of the measuring points P affected by the touches indicate values greater than a noise threshold value for distinguishing the values from a noise value.

In a case where characters are input, for example, a user rarely touches the touch-sensitive area such that the stylus or the finger indicating a position comes closer to the portion of the hand such as the edge of the hand on the little finger side. As such, a position touched by the stylus, for example, tends to be farther away from anywhere in the large area touched by the edge of the hand on the little finger side than other points in the large area. For example, in FIG. 2, a distance between the upper and lower edges of an area touched by the edge of the hand on the little finger side is smaller than a distance between a point in the area touched by the edge of the hand on the little finger side and a position touched by the stylus or the like.

The coordinate calculating unit 22 calculates coordinates of the position indicated by the user with the stylus or the finger based on the measurement values of touch intensity detected by the touch intensity detecting unit 21 at respective measuring points P. The coordinate calculating unit 22 may be implemented by an integrated circuit including a storage unit, such as a memory, and a processor (not shown). In the following, a case is explained where the coordinate calculating unit 22 is implemented by such integrated circuit. The coordinate calculating unit 22 may also be implemented by a digital circuit requiring no program.

Figure 4:
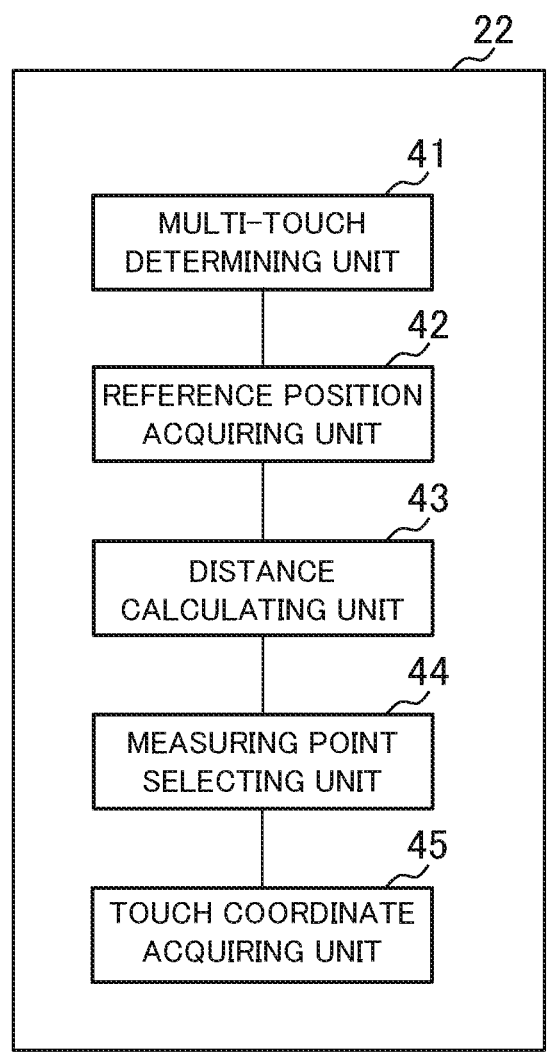
FIG. 4 is a block diagram illustrating functions implemented by a coordinate calculating unit according to the first embodiment.

FIG. 4 is a block diagram illustrating functions implemented by the coordinate calculating unit 22 according to the first embodiment. The coordinate calculating unit 22 functionally includes a multi-touch determining unit 41, a reference position acquiring unit 42, a distance calculating unit 43, a measuring point selecting unit 44, and a touch coordinate acquiring unit 45. These units are implemented by the processor executing a program stored in a storage unit and sending/receiving data to/from other circuits via a bus, for example. The program is stored in a memory in advance, but may be provided through the Internet, for example, or a storage medium, such as a flash memory. In the following, these functions are explained with reference to processing flow charts.

Figure 5:
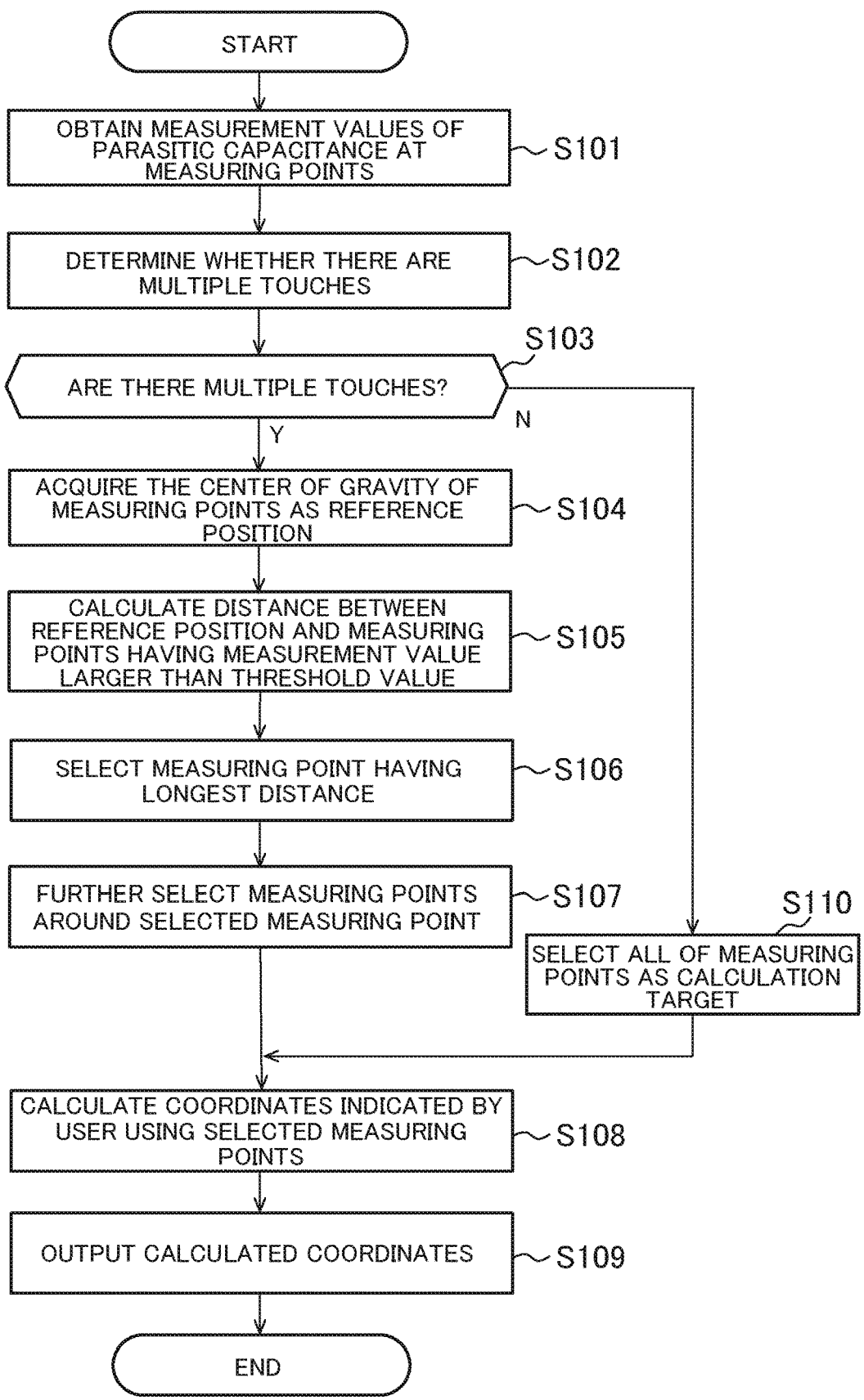
FIG. 5 is a flow chart showing an example of processing of the coordinate calculating unit according to the first embodiment.

FIG. 5 is a flow chart showing an example of processing of the coordinate calculating unit 22 according to the first embodiment. First, the coordinate calculating unit 22 obtains measurement values of parasitic capacitance at the measuring points P from the touch intensity detecting unit 21 (step S101).

Next, the multi-touch determining unit 41 included in the coordinate calculating unit 22 determines whether multiple touches are made on the touch-sensitive area 14 of the touch panel, based on the obtained measurement values of parasitic capacitance (step S102). More specifically, for example, the multi-touch determining unit 41 may calculate the variance of x coordinates of the measuring points P that are larger than a determination threshold value, and determine that there are multiple touches if the variance is larger than a determination reference value. The determination threshold value is larger than the maximum value of minute noise included in the measurement values. Further, the determination threshold value may be larger than the noise threshold value for distinguishing noise. The multi-touch determining unit 41 may count the number of the measuring points P that exceed the determination threshold value, thereby calculating the touched area, and determine that there are multiple touches if the calculated area is larger than the predetermined value. Alternatively, the multi-touch determining unit 41 may determine that there are multiple touches if the multi-touch determining unit 41 can divide the area including all of the measuring points P into a plurality of area using a known Watershed algorism.

If it is determined that there are not multiple touches ("N" in step S103), the one touch is only made, and thus the measuring point selecting unit 44 included in the coordinate calculating unit 22 selects all of the measuring points P for being used to calculate the coordinates (step S110), and proceed to processing of S107 and subsequent steps.

If it is determined that there are multiple touches ("Y" in step S103), the reference position acquiring unit 42 included in the coordinate calculating unit 22 calculates a reference position. More specifically, the reference position acquiring unit 42 acquires the center of gravity of the measuring points P as the reference position based on the coordinates and the measurement values of the measuring points P (step S104). The reference position acquiring unit 42 may take the respective measurement values of the measuring points P as a weight to calculate the center of gravity, or assume the weight of the measuring points P that exceed the predetermined threshold value as 1 (predetermined value) and the weight of other measuring points P as 0 to calculate the center of gravity.

The reference position is a position that represents the positions of the finger and the edge of the hand on the little finger side (or wrist). The area of the touch-sensitive area 14 touched by the edge of the hand on the little finger side is larger than the area touched by the stylus or the like. As such, the number of the measuring points affected by the touch of the edge of the little finger side or other portions of the hand is remarkably greater than the number of the measuring points affected by the touch of the stylus or the like. The calculated center of gravity is a position in the area touched by the edge of the little finger side or other portions of the hand, or a position slightly deviated from such area, and thus can be regarded as the position that represents the positions of the edge of the little finger side or other portions of the hand.

The reference position acquiring unit 42 may acquire the reference position in a different way. For example, information on whether the user is right-handed or left-handed may be stored in the memory beforehand, and if the user is right-handed, the reference position acquiring unit 42 may calculate predetermined first coordinates at the lower right with respect to the center as the reference position, and if the user is left-handed, calculate predetermined second coordinates at the lower left with respect to the center as the reference position. For example, if the user is right-handed, the right edge and lower half of the touch-sensitive area 14 is highly likely to be touched by the edge of the hand on the little finger side, and thus the reference position acquiring unit 42 may also acquire a fixed position at the lower right of the touch-sensitive area 14 as the position (reference position) that represents the positions of the edge of the little finger side or other portions of the hand. Alternatively, the area may be divided into sub areas, such as four areas, and the reference position acquiring unit 42 included in the coordinate calculating unit 22 may calculate, as the reference position, the coordinates of a point (e.g., center) that represents the sub area, in which the largest average value of the measurement values of the measuring points P is achieved (the sum of the measurement values may be used in a case where the number of the measuring point P is the same among the sub areas).

When the reference position is acquired, the distance calculating unit 43 included in the coordinate calculating unit 22 calculates a distance between each of the measuring points P having the measurement value larger than a calculated threshold value and the reference position (step S105). Subsequently, the measuring point selecting unit 44 included in the coordinate calculating unit 22 selects, among from the measuring points P, the measuring point P with its calculated distance from the reference position being the longest as one of the measuring points P to be used for calculating the touched coordinates (step S106). Here, the calculated threshold value may be enough if it is a value that is certainly detected at the center of each touch. The reference position is considered to correspond to the position of the edge of the hand on the little finger side or the wrist, and thus, the measuring point P farthest from the reference position is considered to have capacitance generated by the stylus or the finger. As such, the measuring point P selected by the coordinate calculating unit 22 is expected to be in the vicinity of the position of the stylus or the finger.

Figure 6:
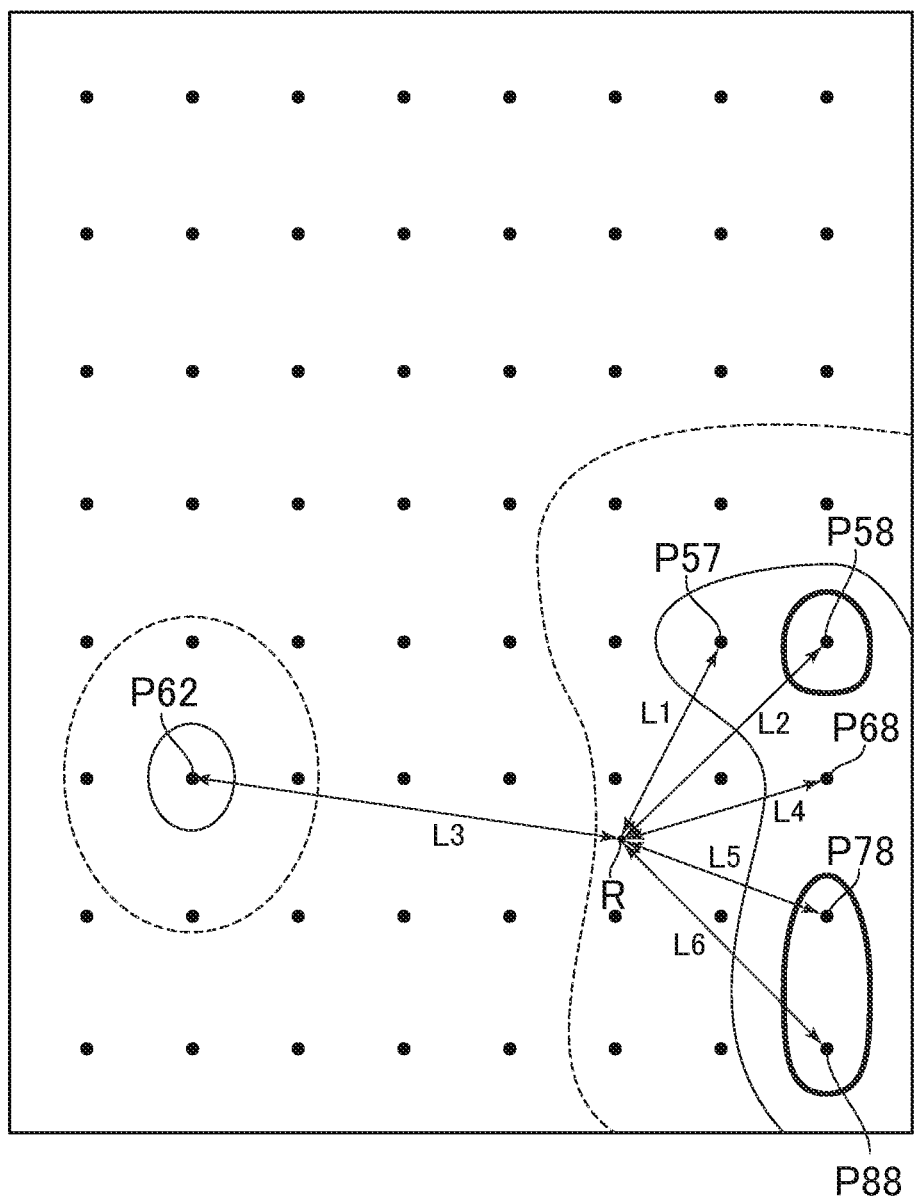
FIG. 6 is a diagram illustrating a relationship in distances between the reference position and the measuring points P in the example of FIG. 3.

FIG. 6 is a diagram illustrating a relationship in distances between the reference position R and the measuring points P in the example of FIG. 3. Assume that the calculated threshold value is represented in a thin solid line in FIG. 6, the measuring points P57, P58, P62, P68, P78, and P88 each has the measurement value larger than the calculated threshold value. In the example of FIG. 6, the coordinate calculating unit 22 calculates distances L1, L2, L3, L4, L5, and L6 between the respective measuring points P and the reference position R, and selects the measuring point P62 at which the longest distance L3 is calculated.

The measuring point selecting unit 44 further selects measuring points P around the selected measuring point P as the measuring points P to be used for calculating the touched coordinates (step S107). In this way, all of the measuring points P used for calculating the coordinates are selected. The surrounding measuring points P may be measuring points P having predetermined positions relative to the selected farthest point, such as, eight measuring points P surrounding the selected point farthest from the reference position. Further, the measuring point selecting unit 44 may select, as the measuring points P to be used for calculating the touched coordinates, the measuring points P that belong to an area, which is one of the areas obtained by dividing the touch-sensitive area 14 using the Watershed algorism and the measurement values and includes the measuring point P at which the longest distance is calculated.

When the measuring points P to be used for calculating the coordinates are selected, the touch coordinate acquiring unit 45 included in the coordinate calculating unit 22 calculates, using the selected measuring points P, the coordinates of the touched position indicated by the user with the stylus or the finger (step S108). Specifically, the touch coordinate acquiring unit 45 acquires the center of gravity, which is calculated by using the measurement values of the selected measuring points P as the weight, as the coordinates of the touched position indicated by the user. Alternatively, by using other methods, the touch coordinate acquiring unit 45 may acquire the coordinates of the position indicated by the user based on the measurement values of the selected measuring points P. The coordinate calculating unit 22 then outputs the calculated coordinates to the host 2 (step S109).

The processor 31, the storage unit 32, the communication unit 33, and the display unit 34 included in the host 2 implement the functions to output images to, for example, the display output device of the display unit 34, by executing the program stored in the storage unit 32 according to the coordinates of the touched position indicated by the user, which are calculated by the coordinate calculating unit 22.

As discussed above, using a relatively simple algorism where the reference position is calculated and the measuring point P farthest from the calculated reference position is selected, it is possible to detect coordinates indicated by the user's finger or stylus by eliminating influence of the touch with the edge of the little finger side or other portions of the hand. The complicated processing, such as clustering, is not employed here, and thus hardware incorporated in the touch panel 1 can easily eliminate the influence of the edge of the hand on the little finger side, although processing capacity of such hardware is typically difficult to be improved.

Second Embodiment

In the first embodiment, the measuring point P that exceeds the calculated threshold value and is farthest from the reference position is selected among from the measuring points P on the predetermined positions on the touch-sensitive area 14 of the touch panel 1, and the coordinates indicated by the user are determined based on the selected measuring point P. Here, it is not necessarily a measuring point P that is selected. In the second embodiment, a point farthest from the reference position is selected from the points whose coordinates are calculated as the touched positions. In the following, differences between the first embodiment and the second embodiment are mainly explained.

The touch panel input device according to the second embodiment includes a touch panel 1, which is a capacitive touch panel, and a host 2, similarly to the first embodiment. The hardware configuration of the touch panel 1 and the host 2 is the same as the first embodiment.

The processing of the coordinate calculating unit 22 according to the second embodiment is different from the first embodiment. The coordinate calculating unit 22 calculates the coordinates of one or more touched positions for each of objects that have touched, based on the measurement values of the measuring points P detected by the touch intensity detecting unit 21. For example, when some objects touch the touch-sensitive area 14 or a large object, such as an edge of a hand on a little finger side, touches the touch-sensitive area 14, coordinates of a plurality of touched positions are calculated, and when a small object, such as a stylus or a finger, touches the touch-sensitive area 14, coordinates of one touched position are calculated. For example, when the stylus and the edge of the hand on the little finger side are in contact with the touch-sensitive area 14, coordinates of touched position of the stylus and coordinates of a plurality of touched positions of the edge of the hand on the little finger side are calculated. More specifically, the coordinate calculating unit 22 divides the touch-sensitive area 14 using a known Watershed algorism, and determines coordinates of touched positions in each of the divided touch-sensitive areas 14, thereby calculating the coordinates of the touched positions. In a case where the coordinate calculating unit 22 cannot divide the touch-sensitive area 14, the measurement values of all of the measuring points P on the touch-sensitive area 14 are used for calculating coordinates of one touched position.

As the example of FIG. 3 shows, when the measurement values are distributed, three touch coordinates respectively corresponding to three points including a peak near the measuring point P62, a peak near the measuring point P18, and a peak near the measuring point P88 are calculated. The coordinate calculating unit 22 outputs the coordinates of the calculated one or more touched positions to the host 2.

Figure 7:
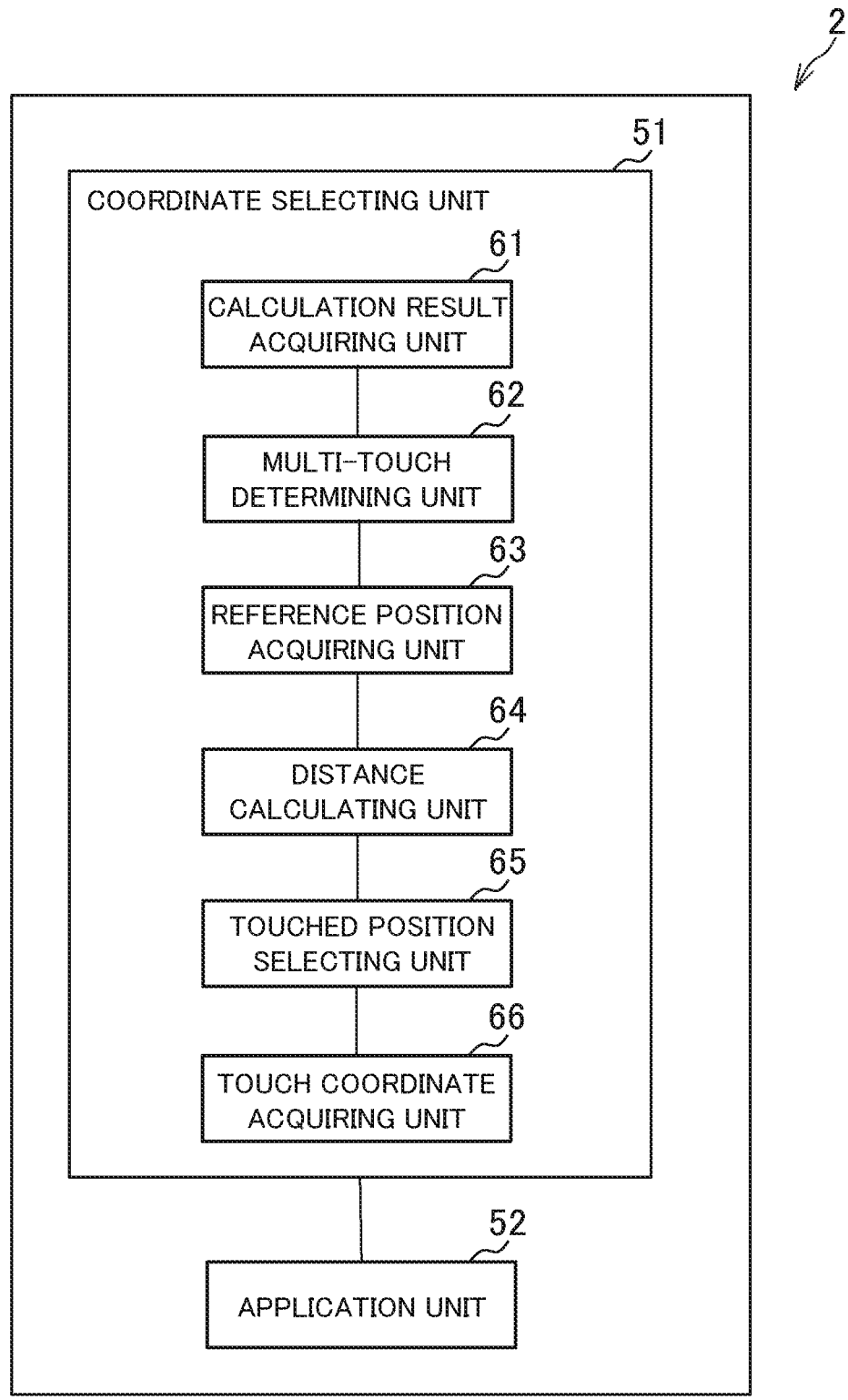
FIG. 7 is a block diagram illustrating functions implemented by a host 2 according to the second embodiment.

FIG. 7 is a block diagram illustrating functions implemented by the host 2 according to the second embodiment. The host 2 functionally includes a coordinate selecting unit 51 and an application unit 52. The coordinate selecting unit 51 includes a calculation result acquiring unit 61, a multi-touch determining unit 62, a reference position acquiring unit 63, a distance calculating unit 64, a touched position selecting unit 65, and a touch coordinate acquiring unit 66. These functions are implemented by the processor 31 executing a program stored in the storage unit 32 and controlling the communication unit 33 and the display unit 34, for example. The program may be provided through the Internet, for example, or by being stored in a computer-readable storage medium, such as a flash memory.

Figure 8:
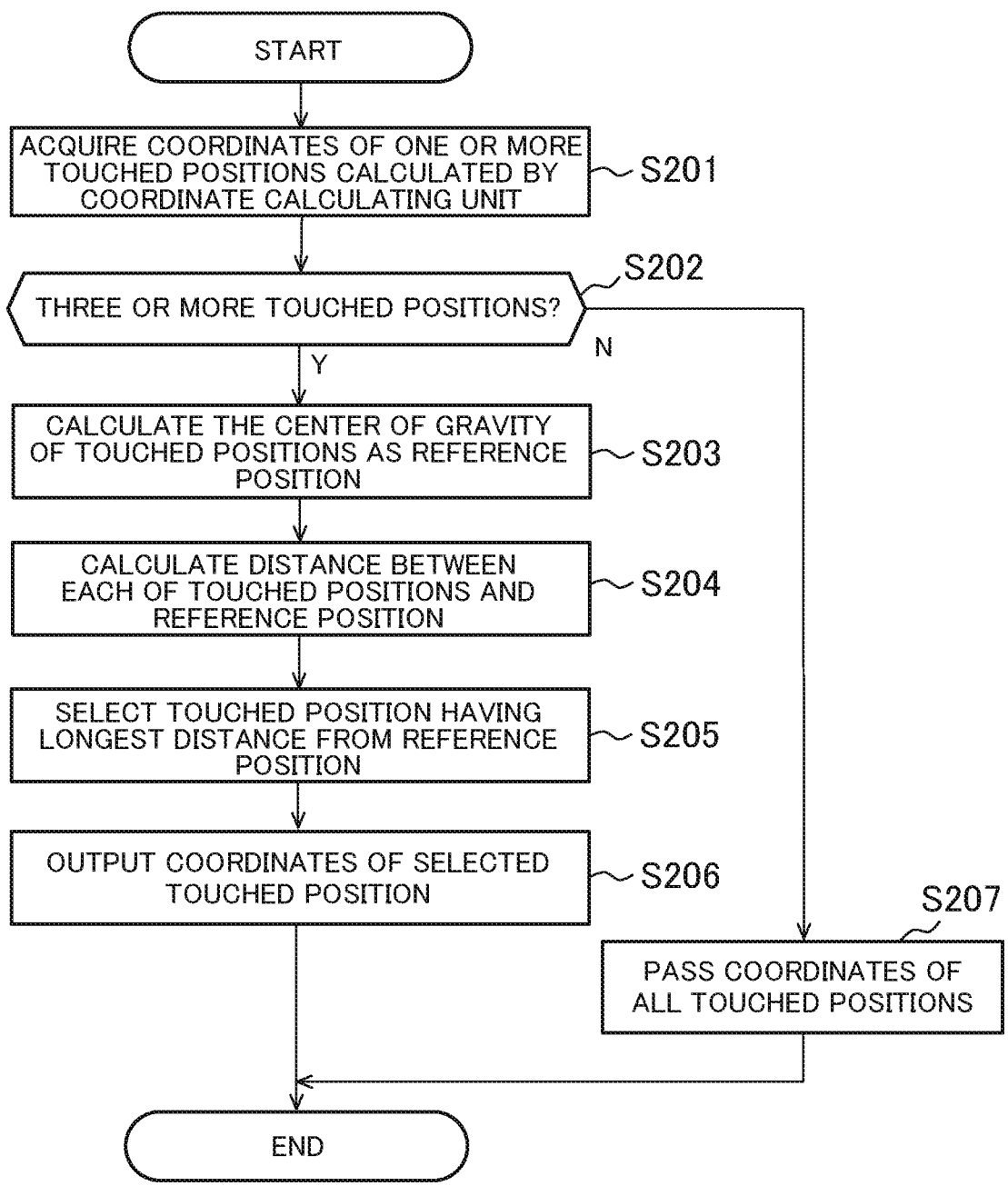
FIG. 8 is a flow chart showing an example of processing of a coordinate selecting unit.

FIG. 8 is a flow chart showing an example of processing of the coordinate selecting unit 51. The coordinate selecting unit 51 is mainly implemented by the processor 31 and the storage unit 32. First, the calculation result acquiring unit 61 included in the coordinate selecting unit 51 acquires coordinates of one or more touched positions output by the coordinate calculating unit 22 via a bus (step S201). Second, the multi-touch determining unit 62 included in the coordinate selecting unit 51 determines whether the edge of the hand on the little finger side or the wrist touches based on the number of touched positions whose coordinates are calculated by the coordinate calculating unit 22 (step S202). If the number of the touched positions is less than three ("N" in step S202), the touched position selecting unit 65 included in the coordinate selecting unit 51 acquires all of the touched position as output target, and the touch coordinate acquiring unit 66 included in the coordinate selecting unit 51 passes the coordinates of all of the acquired touched positions to the application unit 52 (step S207).

On the other hand, if the number of the touched positions is three or more ("N" in step S202), the reference position acquiring unit 63 included in the coordinate selecting unit 51 calculates the reference position in order to select one of the touched positions. More specifically, the reference position acquiring unit 63 calculates the center of gravity of the acquired three or more touched positions as the reference position (step S203). The distance calculating unit 64 included in the coordinate selecting unit 51 calculates a distance between each of the touched positions and the reference position (step S204), and the touched position selecting unit 65 included in the coordinate selecting unit 51 selects the touched position having the longest calculated distance (step S205).

Here, the reference position may not necessarily be the center of gravity. For example, as discussed in the first embodiment, it may be a position that is determined according to the predetermined dominant hand of the user.

Figure 9:
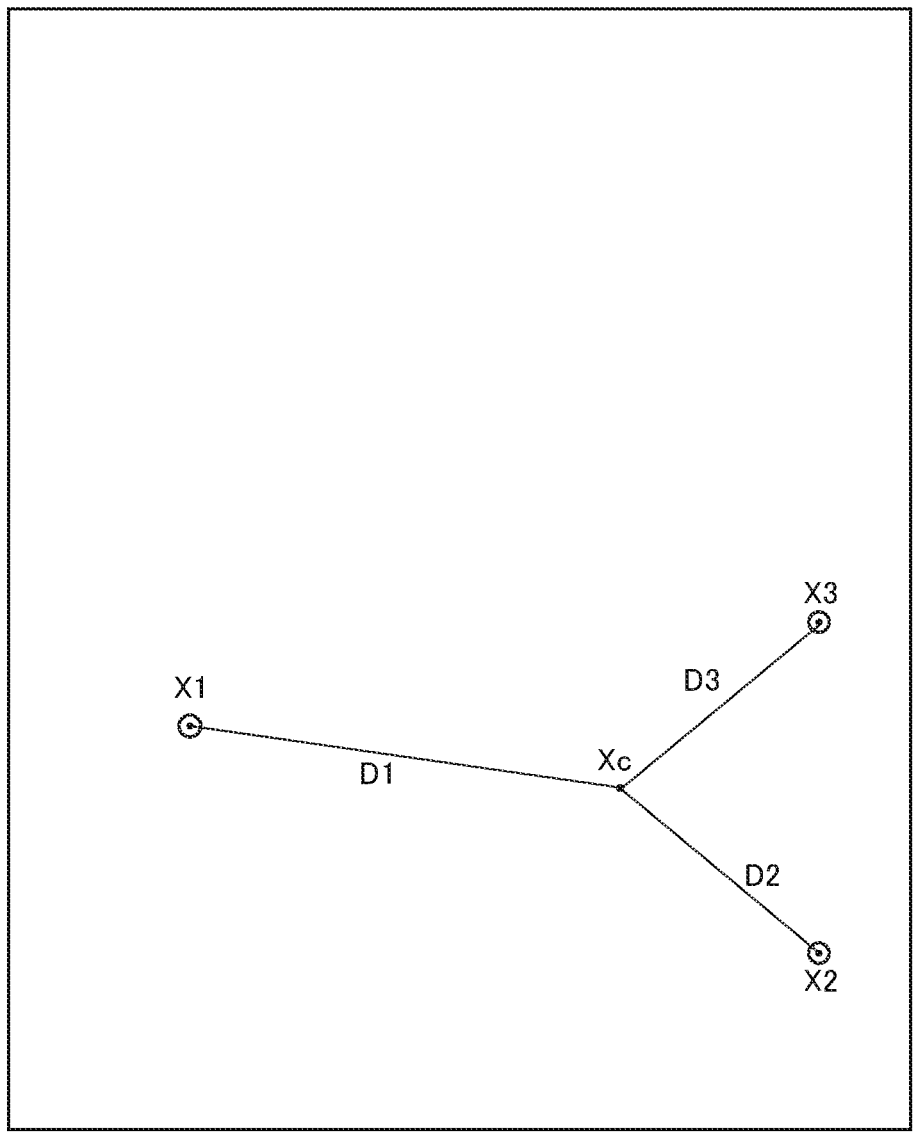
FIG. 9 is a diagram illustrating an example of a relationship among the coordinates of the calculated touched positions, the reference position, and the distances.

FIG. 9 is a diagram illustrating an example of a relationship among the coordinates of the calculated touched positions X1, X2, and X3, the reference position Xc, and the distances D1, D2, and D3. FIG. 9 shows the touched positions X1-X3 that are calculated by the coordinate calculating unit 22 when the measurement values shown in FIG. 3 are measured. The touched position X1 corresponds to the position of the stylus in FIG. 2, and the touched positions X2 and X3 correspond to positions of two points on which stronger touch intensity is detected among the positions touched by the edge of the hand on the little finger side. Typically, a plurality of points are detected in the edge of the hand on the little finger side or the wrist, which have larger areas. In FIG. 9, the reference position Xc is the center of gravity of the touched positions X1-X3, and a position closer to the edge of the hand on the little finger side, as with the first embodiment. As such, the distance D1 is the longest among the distances D1-D3 between the reference position Xc and the touched positions X1-X3, and thus the touched position X1 is selected.

When the touched position is selected, the coordinate selecting unit 51 acquires the coordinates of the selected touched position, and passes the acquired coordinates to the application unit 52 (step S206).

The application unit 52 is implemented by, for example, a processor 31, a storage unit 32, a communication unit 33, and a display unit 34. The application unit 52 is implemented by the processor 31 executing an application program, determines characters and instructions that are input based on the coordinates of the touched positions output by the coordinate selecting unit 51, and executes processing for, for example, displaying images according to the characters and the instructions.

The touch panel input device according to the first embodiment and the second embodiment enables detecting a position indicated by the user with the finger or the stylus even though the edge on the little finger side or other portions of the hand touch the touch panel while the user inputs characters or the like.

The present invention may be applied to other devices than a tablet computer or an electronic book reader. For example, the touch panel input device may be an external touch panel that is connected to a personal computer, for example, or a touch panel provided as a component without including the host 2.

REFERENCE SIGNS LIST

1 touch panel, 2 host, 10 scanning electrode, 12 detection electrode, 14 touch-sensitive area, 21 touch intensity detecting unit, 22 coordinate calculating unit, 31 processor, 32 storage unit, 33 communication unit, 34 display unit, 41,62 multi-touch determining unit, 42,63 reference position acquiring unit, 43,64 distance calculating unit, 44 measuring point selecting unit, 45,66 touch coordinate acquiring unit, 51 coordinate selecting unit, 52 application unit, 61 calculation result acquiring unit, 65 touched position selecting unit, C measuring portion, P measuring point, L1,L2,L3,L4, L5,L6,D1,D2,D3 distance, R,Xc reference position, X1,X2, X3 touched position.

What is claimed is:

1. An input method, comprising:
   acquiring information indicating a plurality of points on a touch panel affected by one or more touches of a user of an input device, including a touch with a finger of the user or a stylus;
   calculating distances between a reference position and at least some of the plurality of points, the reference position indicating a position of a user touch of the input device on the touch panel other than with the finger and other than with the stylus;
   selecting a point, from the at least some of the plurality of points, which has a largest calculated distance from the calculated distances;
   acquiring coordinates of a second position indicated by the user of the input device based on the selected point; and
   wherein, in the point selection, one or more points around the selected point are selected as points affected by the touch with the finger or the stylus.

2. The input method according to claim 1, further comprising:
   determining whether or not a number of the one or more touches of the user of the input device on the touch panel is more than one; and
   acquiring the reference position when it is determined that the number of the one or more touches of the user of the input device on the touch panel is more than one,
   wherein the calculation of the distances is based on the acquired reference position, and
   wherein the point selection is based on the calculated distances between the reference position and the at least some of the plurality of points.

3. The input method according to claim 2,
   wherein, in the determination, whether or not the number of the one or more touches of the user of the input device on the touch panel is more than one, is determined based on a variance of the plurality of points affected by one or more touches of the user of the input device.

4. The input method according to claim 2,
   wherein, in the determination, whether or not the number of the one or more touches of the user of the input device on the touch panel is more than one, is determined based on a size of an area touched by the user.

5. The input method according to claim 1,
   wherein the reference position is a center of gravity based on the plurality of points affected by one or more touches of the user of the input device.

6. The input method according to claim 1,
   wherein the plurality of points affected by one or more touches of the user of the input device respectively correspond to a plurality of portions on the touch panel where a capacitance is measured.

7. The input method according to claim 6,
   wherein the reference position is calculated based on respective positions of the plurality of portions on the touch panel and measurement values at the plurality of portions.

8. The input method according to claim 1,
   wherein each of the plurality of points affected by one or more touches of the user of the input device each indicate a different position affected by the one or more touches of the user of the input device.

9. A non-transitory computer-readable storage medium having stored thereon a program for causing a computer to execute processing, the processing comprising:
   acquiring information indicating a plurality of points on a touch panel affected by one or more touches of a user of an input device, including a touch with a finger of the user or a stylus;
   calculating distances between a reference position and at least some of the plurality of points, the reference position indicating a position of a user touch of the input device on the touch panel other than with the finger and other than with the stylus;
   selecting a point, from the at least some of the plurality of points, which has a largest calculated distance from the calculated distances;
   acquiring coordinates of a second position indicated by the user of the input device based on the selected point; and
   wherein, in the point selection, one or more points around the selected point are selected as points affected by the touch with the finger or the stylus.

10. The non-transitory computer-readable storage medium according to claim 9, the processing further comprising:
    determining whether or not a number of the one or more touches of the user of the input device on the touch panel is more than one; and
    acquiring the reference position when it is determined that the number of the one or more touches of the user of the input device on the touch panel is more than one,
    wherein the calculation of the distances is based on the acquired reference position, and
    wherein the point selection is based on the calculated distances between the reference position and the at least some of the plurality of points.

11. The non-transitory computer-readable storage medium according to claim 10,
    wherein, in the determination, whether or not the number of the one or more touches of the user of the input device on the touch panel is more than one, is determined based on a variance of the plurality of points affected by one or more touches of the user of the input device.

12. The non-transitory computer-readable storage medium according to claim 10,
    wherein, in the determination, whether or not the number of the one or more touches of the user of the input device on the touch panel is more than one, is determined based on a size of an area touched by the user.

13. The non-transitory computer-readable storage medium according to claim 9,
    wherein the reference position is a center of gravity based on the plurality of points affected by one or more touches of the user of the input device.

14. The non-transitory computer-readable storage medium according to claim 9,
    wherein the plurality of points affected by one or more touches of the user of the input device respectively correspond to a plurality of portions on the touch panel where a capacitance is measured.

15. The non-transitory computer-readable storage medium according to claim 14,
    wherein the reference position is calculated based on respective positions of the plurality of portions on the touch panel and measurement values at the plurality of portions.

16. The non-transitory computer-readable storage medium according to claim 9,
where each of the plurality of points affected by one or more touches of the user of the input device each indicate a different position affected by the one or more touches of the user of the input device.

* * * * *